US012663075B2

(12) United States Patent
Weissenfluh et al.

(10) Patent No.: US 12,663,075 B2
(45) Date of Patent: Jun. 23, 2026

(54) CENTER CASTING AND GOVERNOR FOR AUTOMATIC TRANSMISSION CLUTCH

(71) Applicant: Goerend Transmissions, Inc., Saint Lucas, IA (US)

(72) Inventors: James W. Weissenfluh, Waucoma, IA (US); Chase H. Langreck, West Union, IA (US)

(73) Assignee: Goerend Transmissions, Inc., Saint Lucas, IA (US)

( * ) Notice: Subject to any disclaimer, the term of this patent is extended or adjusted under 35 U.S.C. 154(b) by 0 days.

(21) Appl. No.: 18/812,839

(22) Filed: Aug. 22, 2024

(65) Prior Publication Data

US 2026/0055810 A1 Feb. 26, 2026

(51) Int. Cl.
*F16H 61/00* (2006.01)
*F16H 61/02* (2006.01)

(52) U.S. Cl.
CPC ..... *F16H 61/0009* (2013.01); *F16H 61/0206* (2013.01)

(58) Field of Classification Search
CPC ........................ F16H 61/0009; F16H 61/0206
See application file for complete search history.

(56) References Cited

U.S. PATENT DOCUMENTS 8,747,270 B1 * 6/2014 Samie ................... F16H 61/143
475/123
2010/0107625 A1 * 5/2010 Harrison ............. F16H 61/0206
29/890.121

2014/0352824 A1 * 12/2014 Yamada .............. F16H 61/0021
137/624.27
2019/0003576 A1 * 1/2019 Hardin ................ F16H 61/0206
2021/0003209 A1 * 1/2021 Saito ................... F16H 57/0435
2023/0184323 A1 * 6/2023 Frait ..................... F15B 13/085
137/354

* cited by examiner

*Primary Examiner* — Farhana Pervin

(74) *Attorney, Agent, or Firm* — McKee, Voorhees & Sease, PLC

(57) ABSTRACT

An automatic transmission maintains the rear band in an applied condition in drive range first gear, as well as the other forward gear selector positions so as to utilize the extra holding force of the rear band while in first gear without having to change the selected position for automatic shifting. The hydraulic circuitry in the central casting provides fluid communication with the governor body to apply the rear band in the drive range first gear (D1). The governor body includes a valve to apply and release the rear band. The method brakes an automatic transmission by providing hydraulic circuitry in the central casting coupled to the governor body such that the rear band of the transmission is applied in drive range first gear. The valve in the governor body moves between open and closed positions to apply and release the rear band, respectively, and exhausting hydraulic fluid when the valve is closed. The rear band releases when the automatic transmission shifts out of drive range first gear. A trans-brake may also be utilized while the rear band is applied.

17 Claims, 16 Drawing Sheets
(5 of 16 Drawing Sheet(s) Filed in Color)

10

10

Crysler 47/48 Re Component Application Chart

| Gear | Front Clutch | Front Band | Rear Clutch | Rear Band | Low-Roller Clutch | Overdrive Clutch | OD/Direct Clutch | OD Roller Clutch |
|---|---|---|---|---|---|---|---|---|
| Reverse | ON | | | ON | | | ON | |
| D-1st | | | ON | | Hold | | ON | Hold |
| D-2nd | | ON | ON | | | | ON | Hold |
| D-3rd | ON | | ON | | | | ON | Hold |
| D-4th | ON | | ON | | | ON | | |
| Manual - 2nd | | | ON | | | | ON | Hold |
| Manual - 1st | | | ON | ON | Hold | | ON | Hold |

FIG. 14A
(Prior Art)

Crysler 47/48 Re Component Application Chart

| Gear | Front Clutch | Front Band | Rear Clutch | Rear Band | Low-Roller Clutch | Overdrive Clutch | OD/Direct Clutch | OD Roller Clutch |
|---|---|---|---|---|---|---|---|---|
| Reverse | ON | | | ON | | | ON | |
| D-1st | | | ON | ON | Hold | | ON | Hold |
| D-2nd | | ON | ON | | | | ON | Hold |
| D-3rd | ON | | ON | | | | ON | Hold |
| D-4th | ON | | ON | | | ON | | |
| Manual - 2nd | | | ON | | | | ON | Hold |
| Manual - 1st | | | ON | ON | Hold | | ON | Hold |

FIG. 14B

CENTER CASTING AND GOVERNOR FOR AUTOMATIC TRANSMISSION CLUTCH

TECHNICAL FIELD

The field of invention is automatic transmissions, and particularly, a center casting and governor body for an automatic transmission which maintains the rear band in an applied condition in drive range first gear, as well as the other forward gear selector positions so as to utilize the extra holding force of the rear band while in first gear without having to change the selected position for automatic shifting.

BACKGROUND

Factory or original equipment automatic transmissions, such as the Chrysler 47/48 RE automatic transmission, utilize a series of clutches, bands, and roller clutches engaged in different combinations to provide four different forward gear ratios and one reverse gear. The gear selector of the vehicle normally has options for forward motion, typically designated as D, 2, and 1 (D known as drive range, 2 known as manual second or M2, and 1 known as manual first or M1). Additional gear selector positions include P (park) R (reverse) and N (neutral). The gear selector for the vehicle can be moved between drive (D), first (M1), and second (M2) forward positions, as well as the reverse (R), neutral (N), and park (P) positions. During normal operation, with the vehicle gear selector in the forward drive range position, the transmission will begin in first gear, and then automatically shift up and/or down through the other gears, based on road speed and throttle position, as set by the vehicle's computer programming. When the gear selector is in the manual second position, the transmission will begin in first gear, and then upshift to second gear when the upshift parameter is met, but will not shift to any higher gear. When the gear selector is in the manual first position, the transmission will begin in first gear and will not upshift, unless the selector is moved to a different position. The M1 drive position differs from drive D or M2 by bringing on the low/reverse or rear band in addition to the low roller clutch as the holding member for additional holding force on the low/reverse drum. M1 is designed for starting out with a heavy load wherein the additional force applied by the rear band helps hold or maintain the torque on the low/reverse drum. Excessive torque applied to the low roller clutch can cause failure, which causes damage to the transmission case and internal components. For high horsepower and racing applications, it is desirable to start in M1 to have the rear band applied or "on" for extra holding force, but the gear selector must be changed to D to resume automatic up shifts. Changing the gear selector for optimum racing requires skill and precise timing.

Therefore, a primary objective of the present invention is the provision of an automatic transmission which applies the rear band in the D selector position, thereby utilizing the extra holding force of the rear band while in first gear, without having to change the gear selector position for automatic shifting.

Another objective of the present invention is the provision of a center casting and governor body for automatic transmission which is the rear band "on" in drive range first D selector position.

A further objective of the present invention is the provision of a trans-brake for use on an automatic transmission wherein the rear band is on in drive range first gear (D). A further objective of the present invention is the provision of a trans-brake for use on an automatic transmission wherein the rear band is on in drive range first gear (D1).

A further objective of the present invention is the provision of an automatic transmission with a trans-brake which electronically or mechanically applies the same combination of transmission components as forward and reverse gears, thereby locking the gear train, while the rear band is on in the drive range first gear (D).

These and other objectives will become apparent from the following description of the invention.

SUMMARY

An automatic transmission has first, second, third, and fourth D or drive range gears, as well as, reverse gear, neutral and park. The gear selector is movable between drive (D), manual first (1), manual second (2), reverse, park, and neutral positions. The vehicle driver moves the gear selector from park to the desired gear position. The automated transmission includes a series of clutches, and front and rear bands, engageable in various combinations to provide the different forward and reverse gears. The automatic transmission includes a central casting or plate having channels therein forming hydraulic circuitry for the automatic transmission. The transmission also includes a governor body operatively connected to the central casting and to the bands. The hydraulic circuitry in the central casting provides fluid communication with the governor body to apply the rear band in the drive range first gear (D1). The governor body includes a valve to apply and release the rear band. A trans-brake may be utilized, and coupled with the rear band when the rear band is on, so as to lock the transmission.

The method of the present invention operates an automatic transmission by providing hydraulic circuitry in a central casting coupled to a governor body such that the rear band of the transmission is applied in drive range first gear. This method is accomplished by moving a valve in the governor body between open and closed positions to apply and release the rear band, respectively, and exhausting hydraulic fluid when the valve is closed. The rear band releases when the automatic transmission shifts out of drive range first gear. The method may also utilize a trans-brake while the rear band is applied.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 14A is a chart showing the prior art transmission component application, including the rear band being on only in reverse and manual first drives.

FIG. 14B is the chart showing the transmission component application, according to the present invention, including the rear band being on in the drive first gear position (D1).

DETAILED DESCRIPTION

Figures 1A, 3:
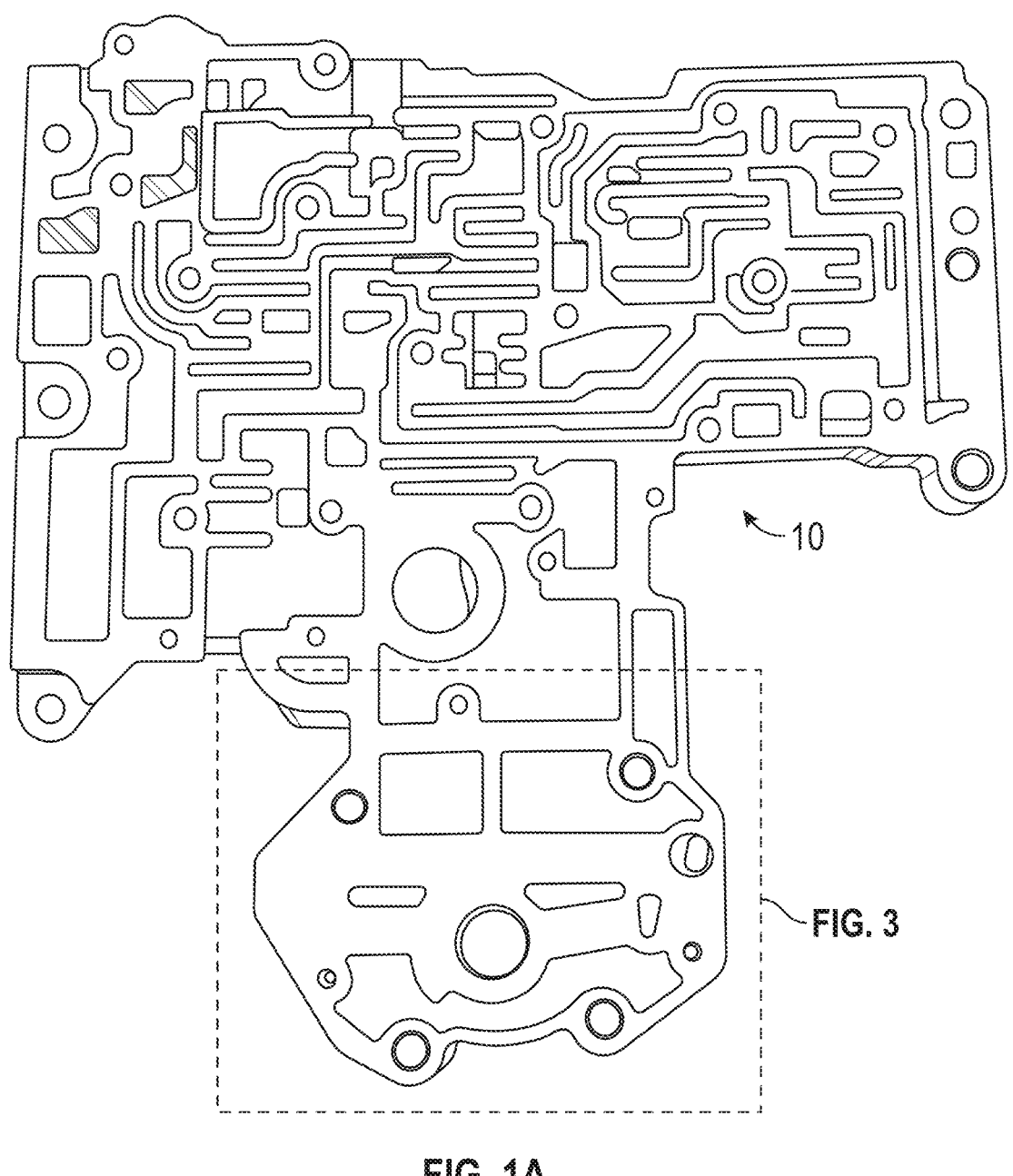
FIG. 1A is top plan view of a prior art center casting.
FIG. 3 is an enlargement of the area 3-3 from FIG. 1A.
Figures 1B, 2:
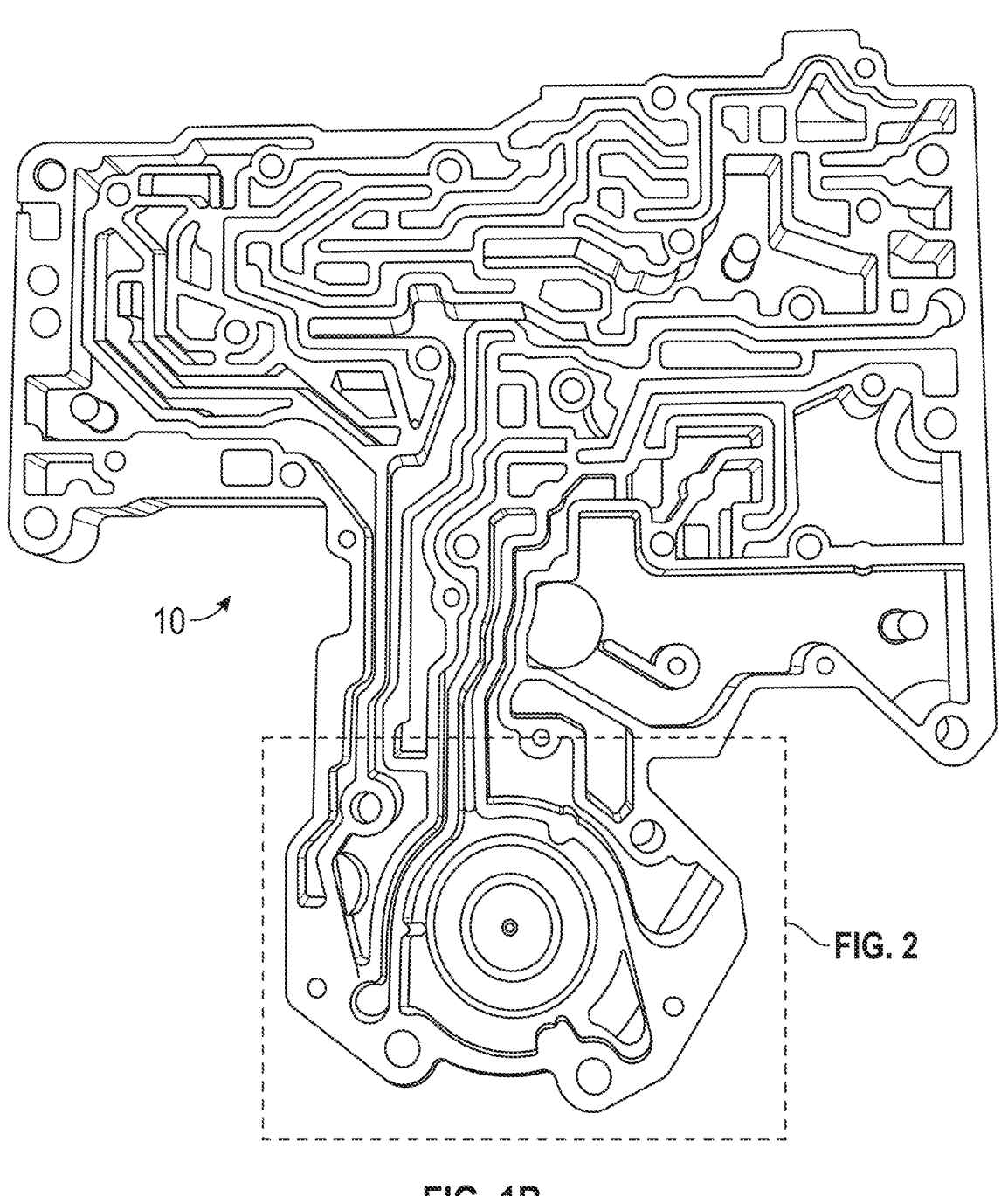
FIG. 1B a bottom plan view of the prior art center casting.
FIG. 2 is an enlargement of the area 2-2 of FIG. 1B.
Figure 2:
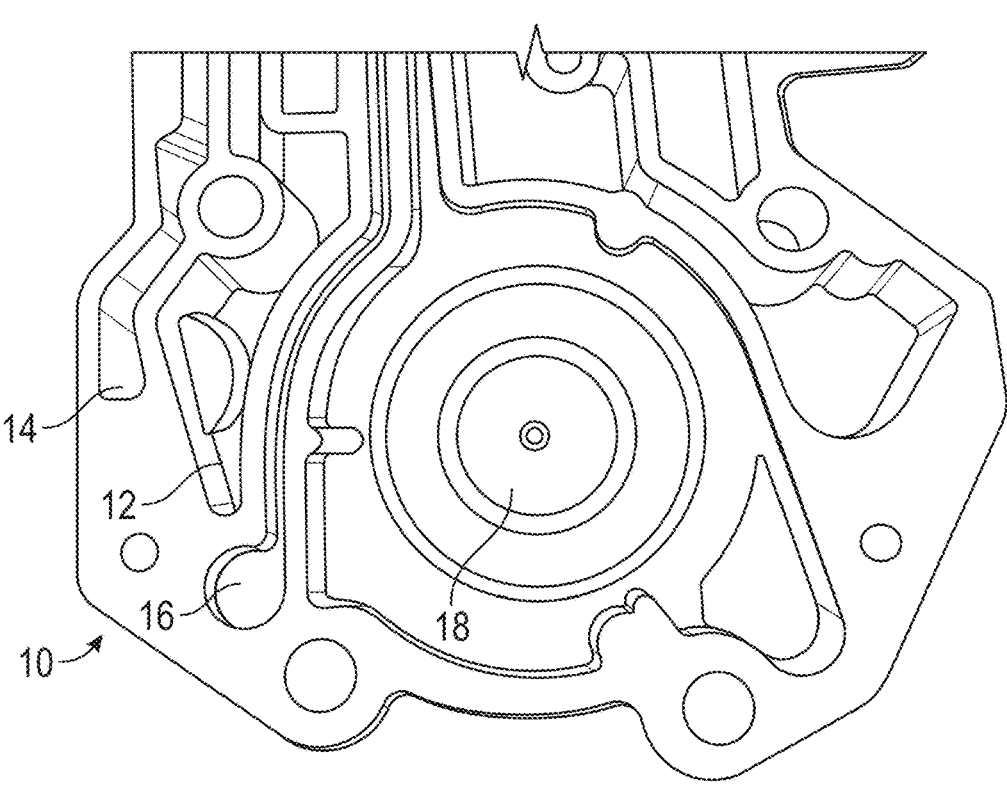
Figure 3:
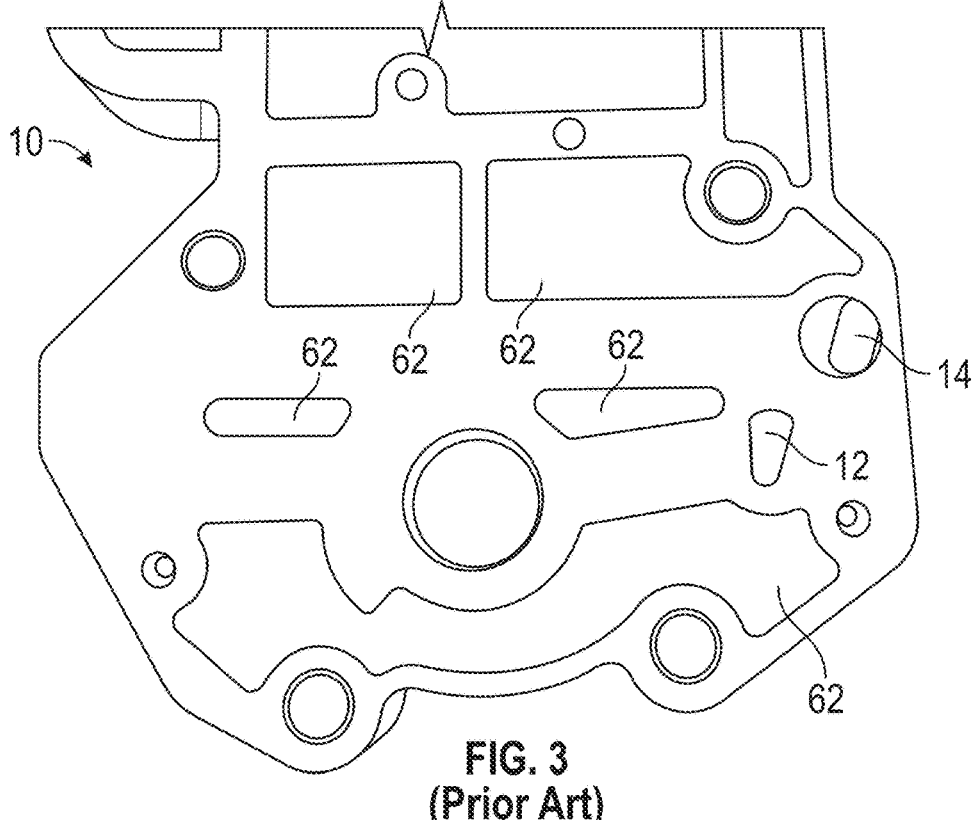
Figure 6:
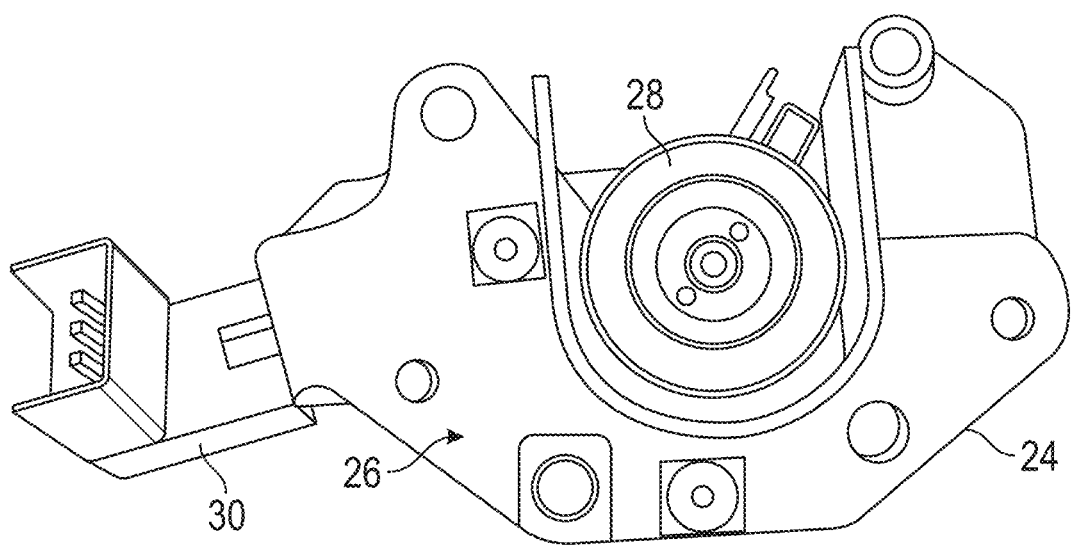
FIG. 6 is a top plan view of a prior art governor body and components.
Figure 7:
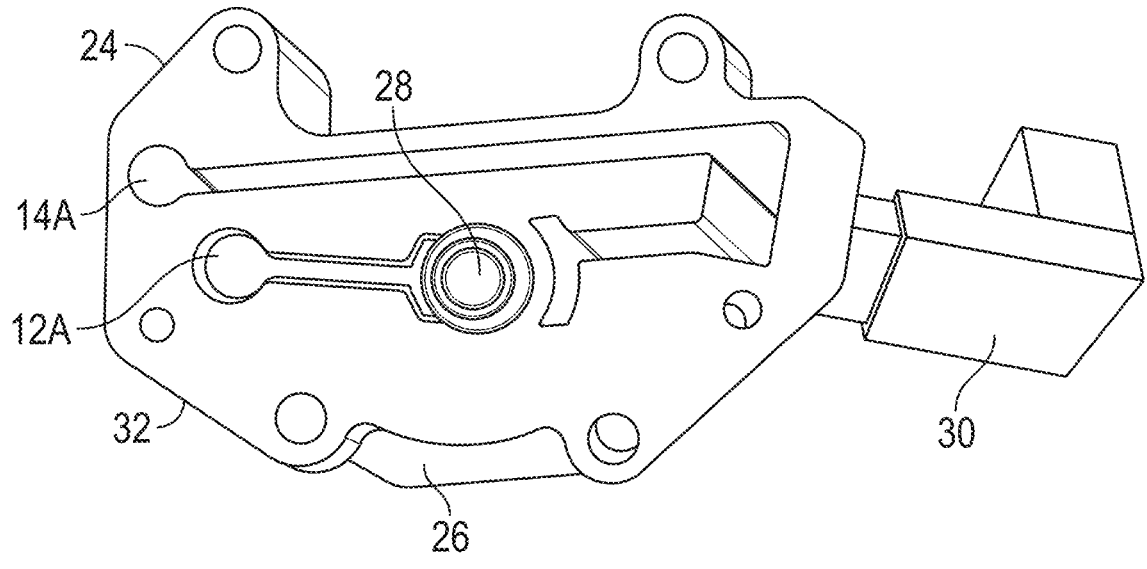
FIG. 7 is a bottom plan view of the prior art governor body and components.

A conventional channel plate center casting for an automatic transmission valve body is shown in FIGS. 1A and 1B, and designated by the reference numeral 10. The casting 10 has a plurality of channels which form the hydraulic circuitry for the transmission clutches (not shown). As seen in FIGS. 2 and 3, casting 10 includes a line pressure circuit 12, a governor pressure circuit 14, a rear servo circuit 16, and a second gear circuit 18. A conventional governor body 24 (FIGS. 6 and 7) is mounted to the casting 10 with a governor bracket 26. The conventional governor body 24 includes a solenoid 28 and a pressure sensor 30.

Figure 4:
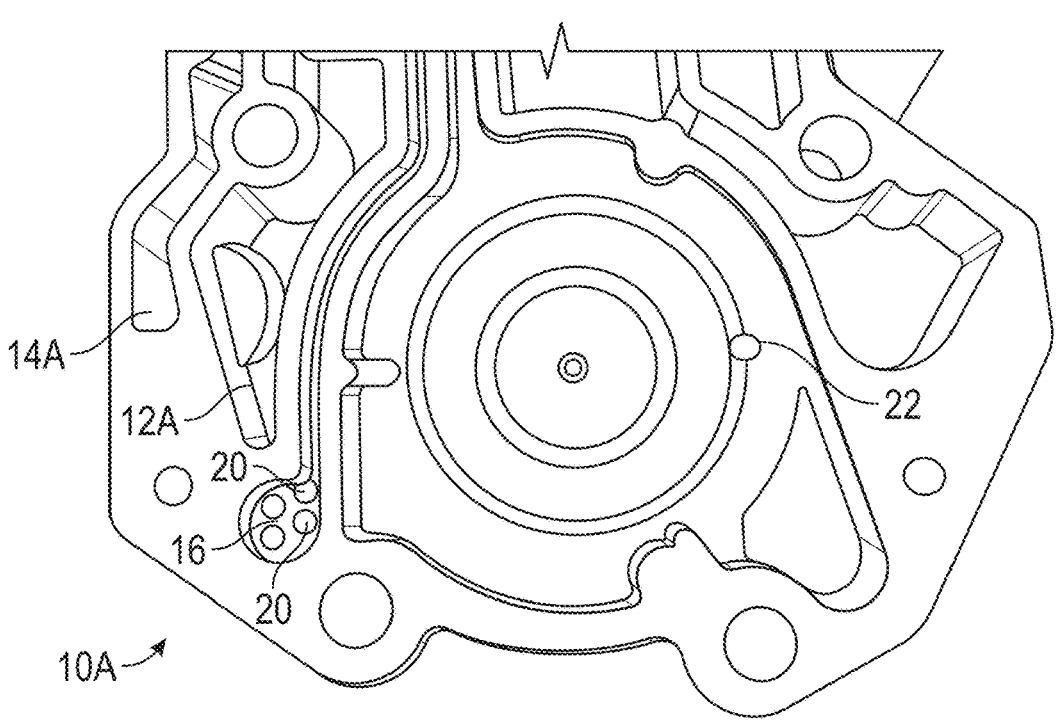
FIG. 4 is a view similar to FIG. 2, but showing modifications according to the present invention.
Figure 5:
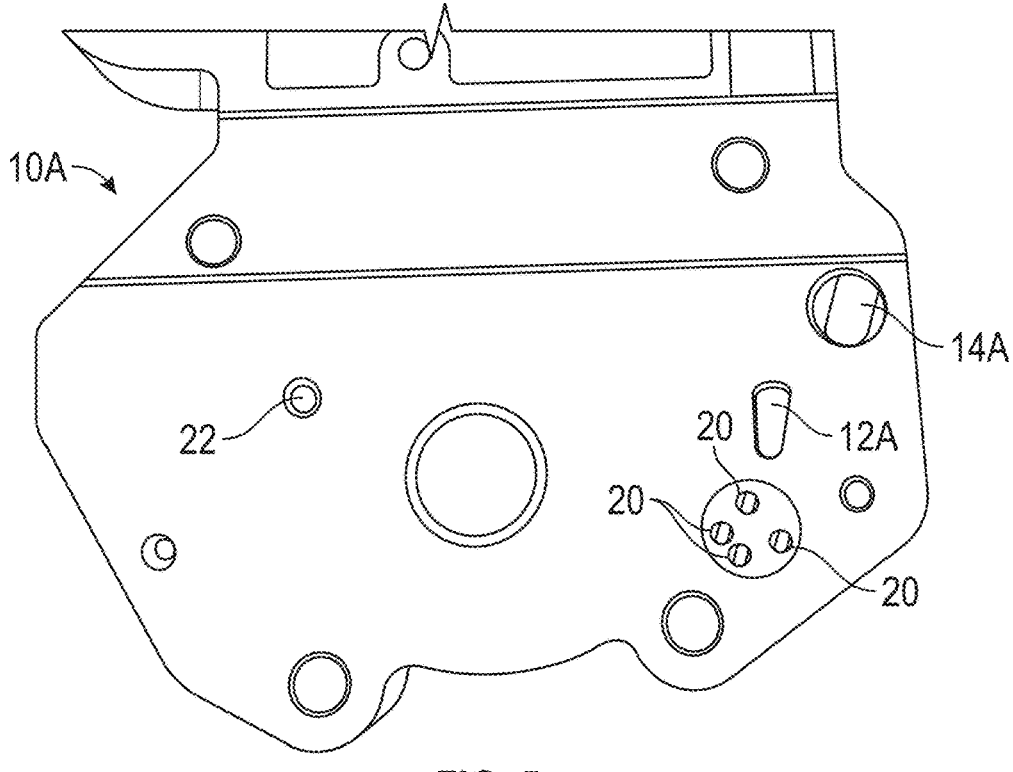
FIG. 5 is a view similar to FIG. 3, but showing modifications according to the present invention.
Figure 8A:
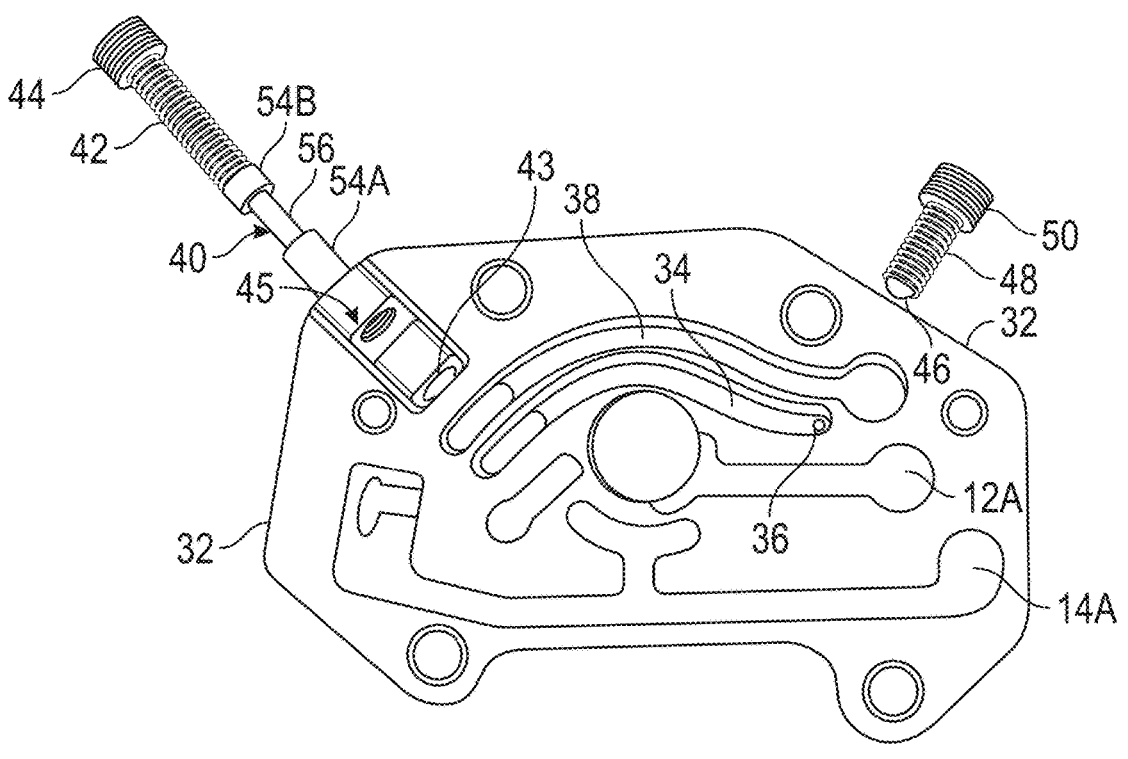
FIG. 8A is a top plan view of the new governor body according to the present invention, with valves removed from the governor body for clarity.
Figure 8B:
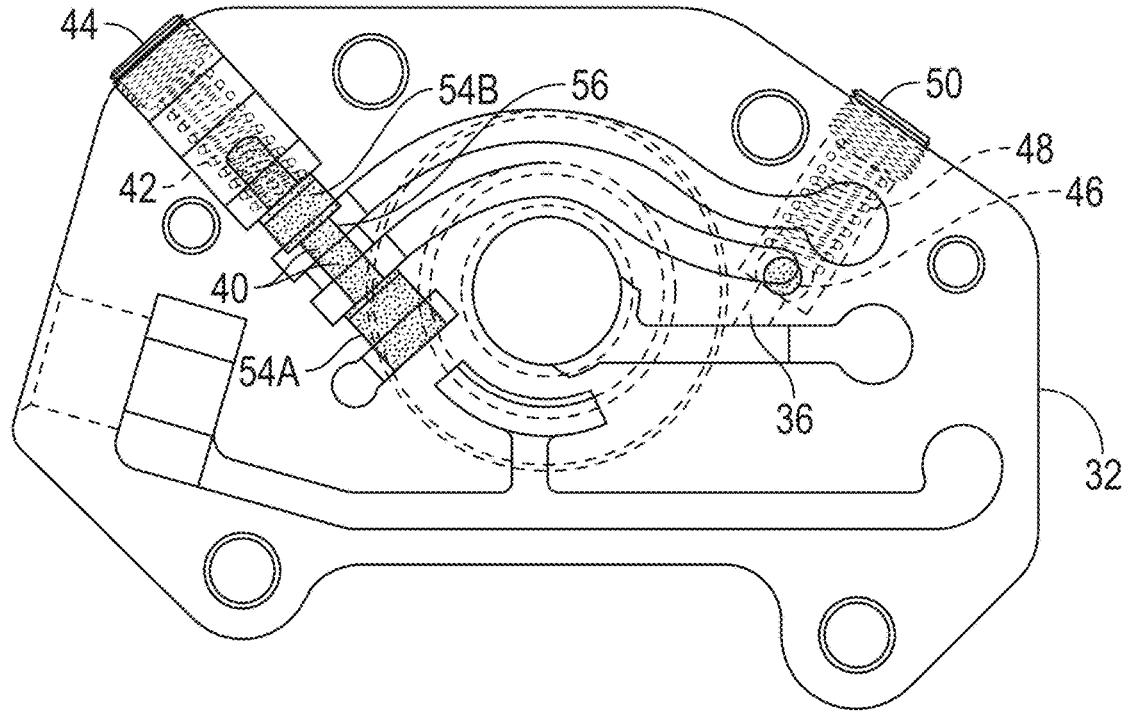
FIG. 8B is a view similar to FIG. 8A with the valves mounted in the governor body.
Figure 9:
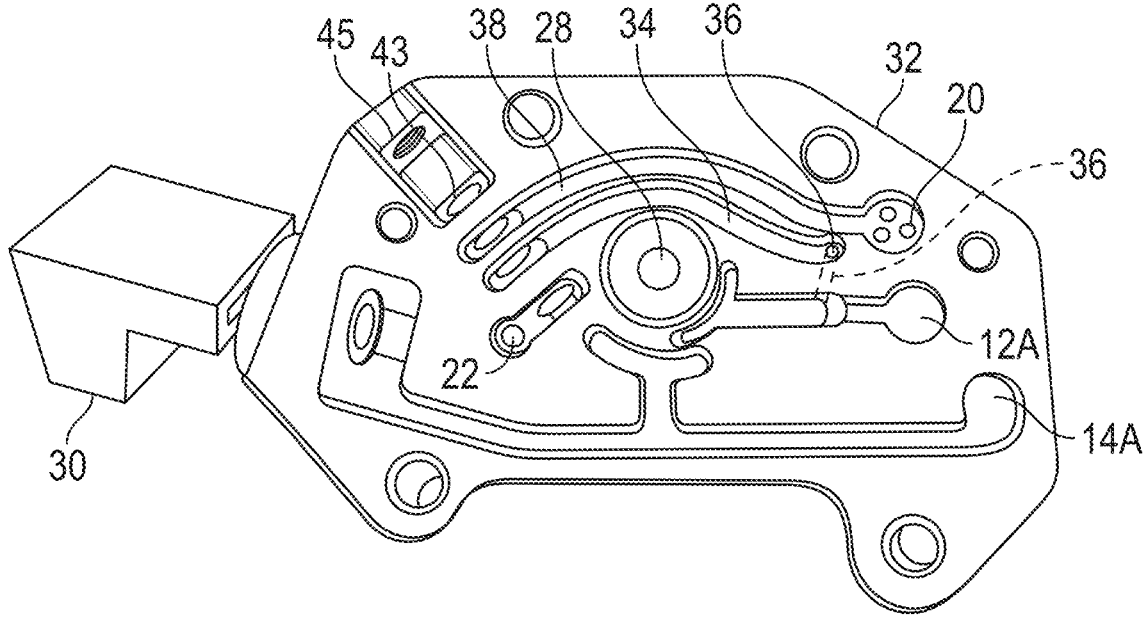
FIG. 9 is a bottom plan view of the new governor body according to the present invention.

The present invention modifies the casting 10 to become central casting 10A (FIGS. 4 and 5) to provide additional hydraulic circuitry which is particularly useful for high horsepower and racing applications, where low/reverse roller clutch failure has been a problem. The present invention also replaces the prior art governor body 24 with a new governor body 32, as shown in FIGS. 8 and 9. More particularly, a series of holes 20 provides communication between the rear servo circuit 16 and the governor body 32. A new hole 22 is formed in the casting 10A, so as to provide communication between the second gear circuit 18 and the governor body 32. The holes 20, 22 are best seen in FIGS. 4 and 5 of the drawings.

A new oil passage 34 is formed in the governor body 32, and communicates with the line pressure circuit 12A of the governor body 32 via a hole or passageway 36. A second new hydraulic circuit 38 is formed in the governor body 32, and communicates with rear servo circuit 16 through holes 20 in central casting 10A. Oil flow through the circuit 38 is controlled by a valve 40, a spring 42, and an end plug 44. The valve 40 is moveable between an open/rest position and a closed/stroked position. The governor body also includes a check ball 46 with a spring 48 and end plug 50, which controls oil flow through circuit 34. The valve 40 and spring 42 reside within a recess or valve bore 43 formed in the governor body 32. As seen in FIGS. 8A and 8B, the valve 40 has an inner end with an increased diameter or spool 54A and a reduced diameter 56 above or outwardly from the increased diameter portion 54A. Located outwardly from the reduced diameter 56 is another increased diameter portion, spool 54B. When the valve 40 is at open or at rest, the spool 54A blocks fluid flow from circuit 34 to or through the second gear circuit 18 while spool 54B blocks circuit 38 from exhaust port 45, while reduced diameter 56 allows fluid communication between circuits 34 and 38. When the valve 40 is closed or stroked, the decreased diameter portion 56 opens fluid flow from circuit 38 to exhaust port 45, while spool 54A continues to block circuit 34 from second gear circuit 18.

The valve 40 facilitates the apply and release of the rear servo or band 60. The check ball 46 prevents cross leaking from the reverse to forward circuits while in reverse.

The governor body 32 incorporates the existing hydraulic circuits from the prior art governor body 24, as well as housing the governor solenoid 28 and governor pressure sensor 30, so as to maintain the functionality of the prior art governor body 24.

As seen in comparing FIGS. 3 and 5, the top surface of the channel casting 10A is machined flat or smooth to provide a sealing surface for the new governor body 32. The channel casting 10A does not have the recesses or pockets 62 found in the prior art casting 10.

The holes 20 are built into the rear band for servo circuit 16 to create an oil passage to the top side and to the governor body 32. The hole 22 is drilled into the second gear circuit 18 to create an oil passage to the top side and to the governor body 32.

Figure 10:
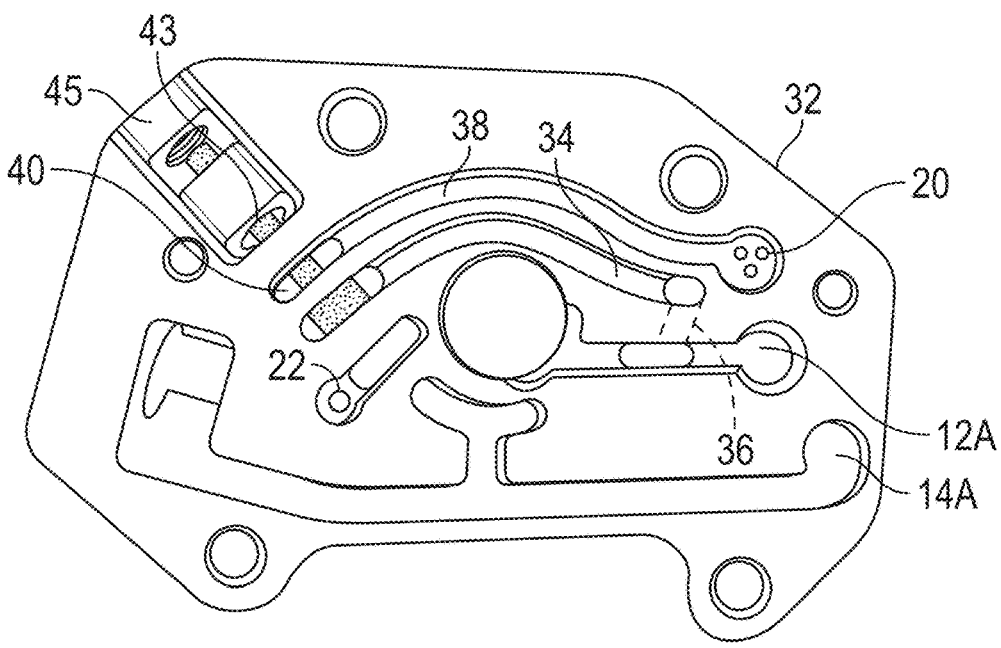
FIG. 10 is a view showing the new governor body with the valve in a stroke position.
Figure 11:
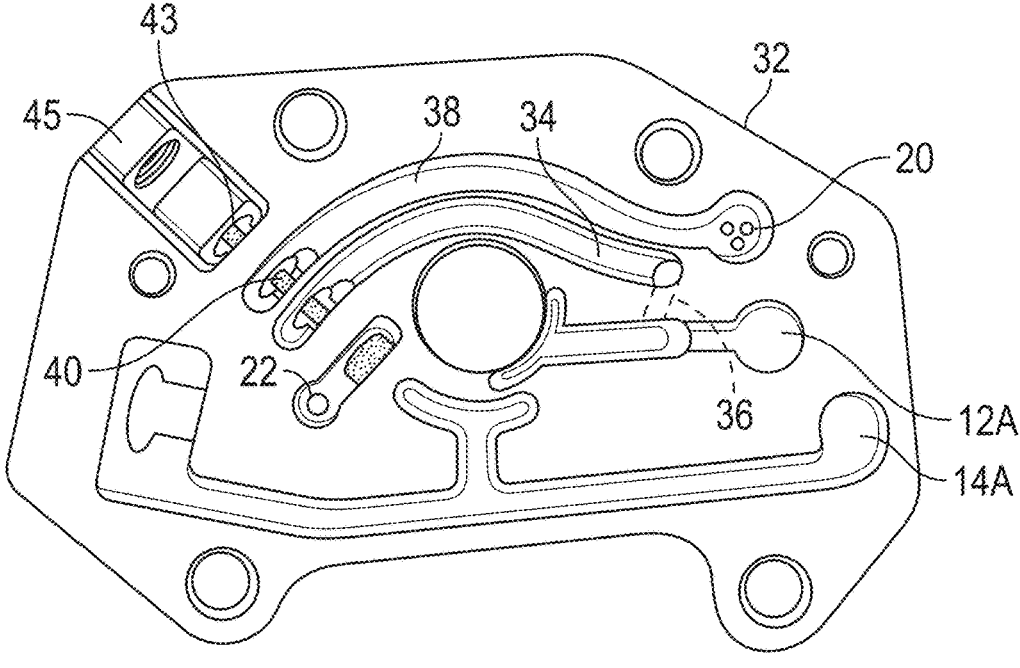
FIG. 11 is a view of the new governor body showing the valve in a resting position.
Figure 12:
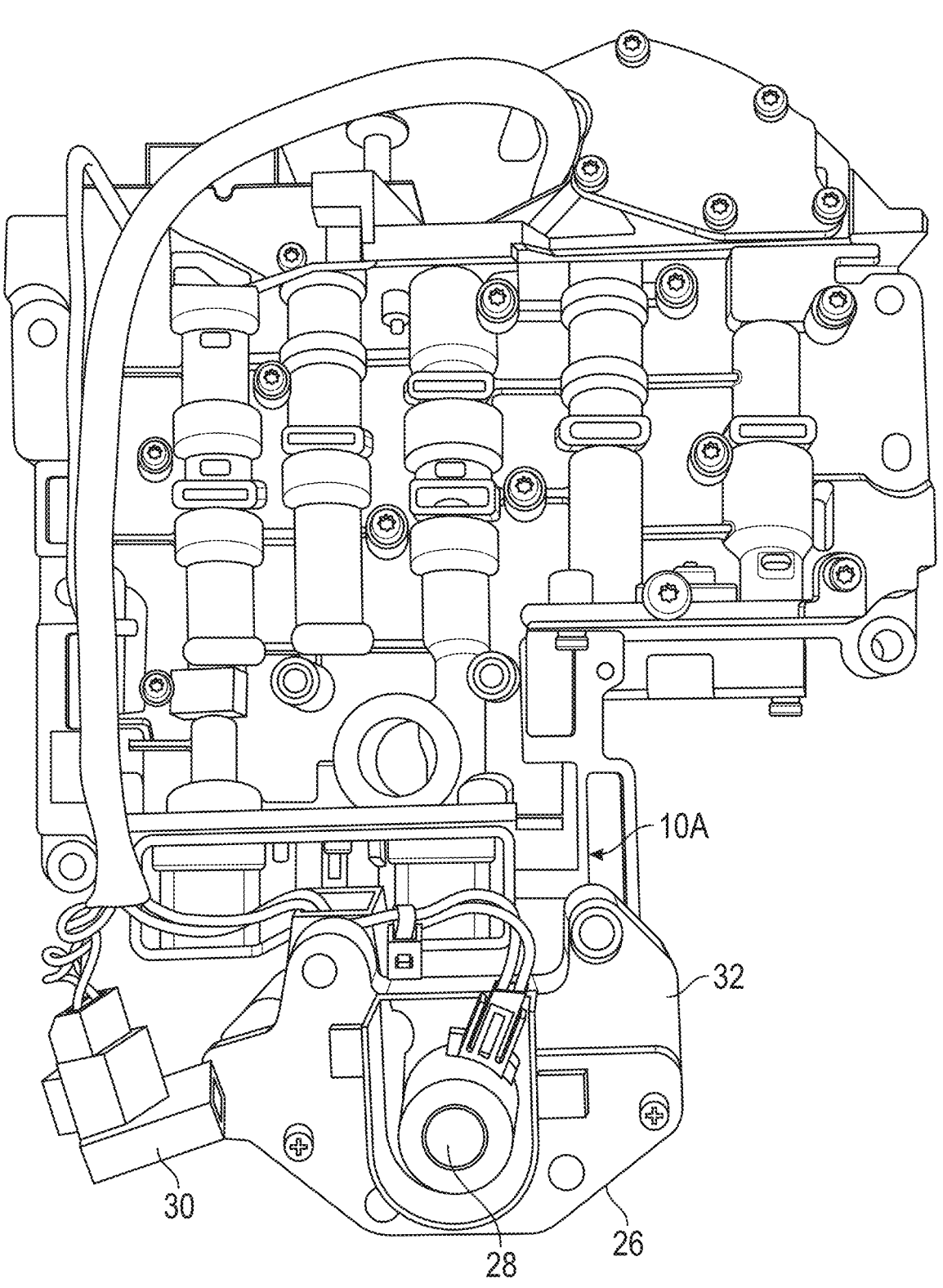
FIG. 12 is a plan view showing the assembled central casting and governor body according to the present invention.
Figure 13:
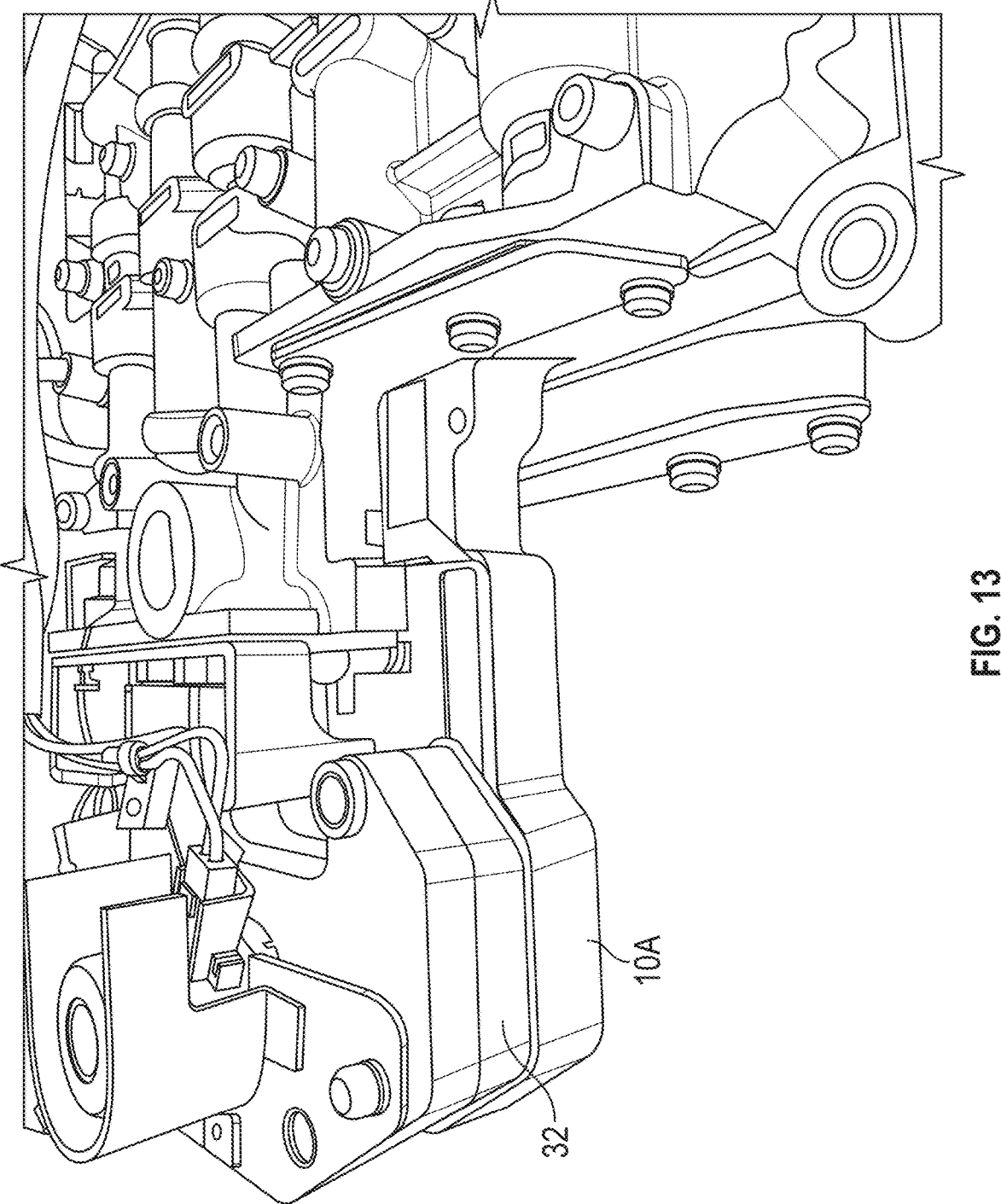
FIG. 13 is a perspective view of the assembled central casting and governor body according to the present invention.
Figure 15:
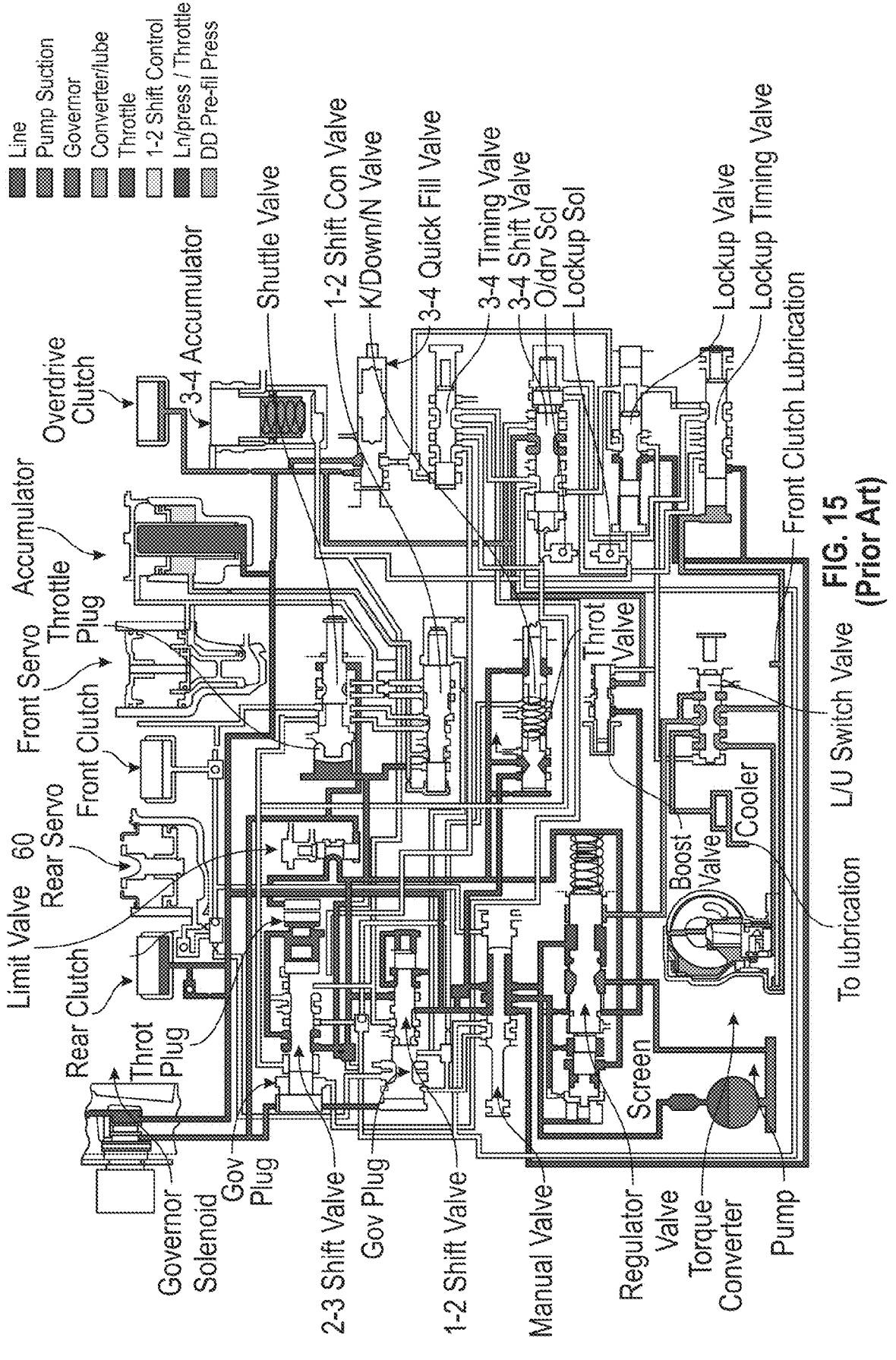
FIG. 15 is a hydraulic circuitry schematic for the prior art transmission shown in FIGS. 1A and 1B, in drive range first gear (D1).
Figure 16:
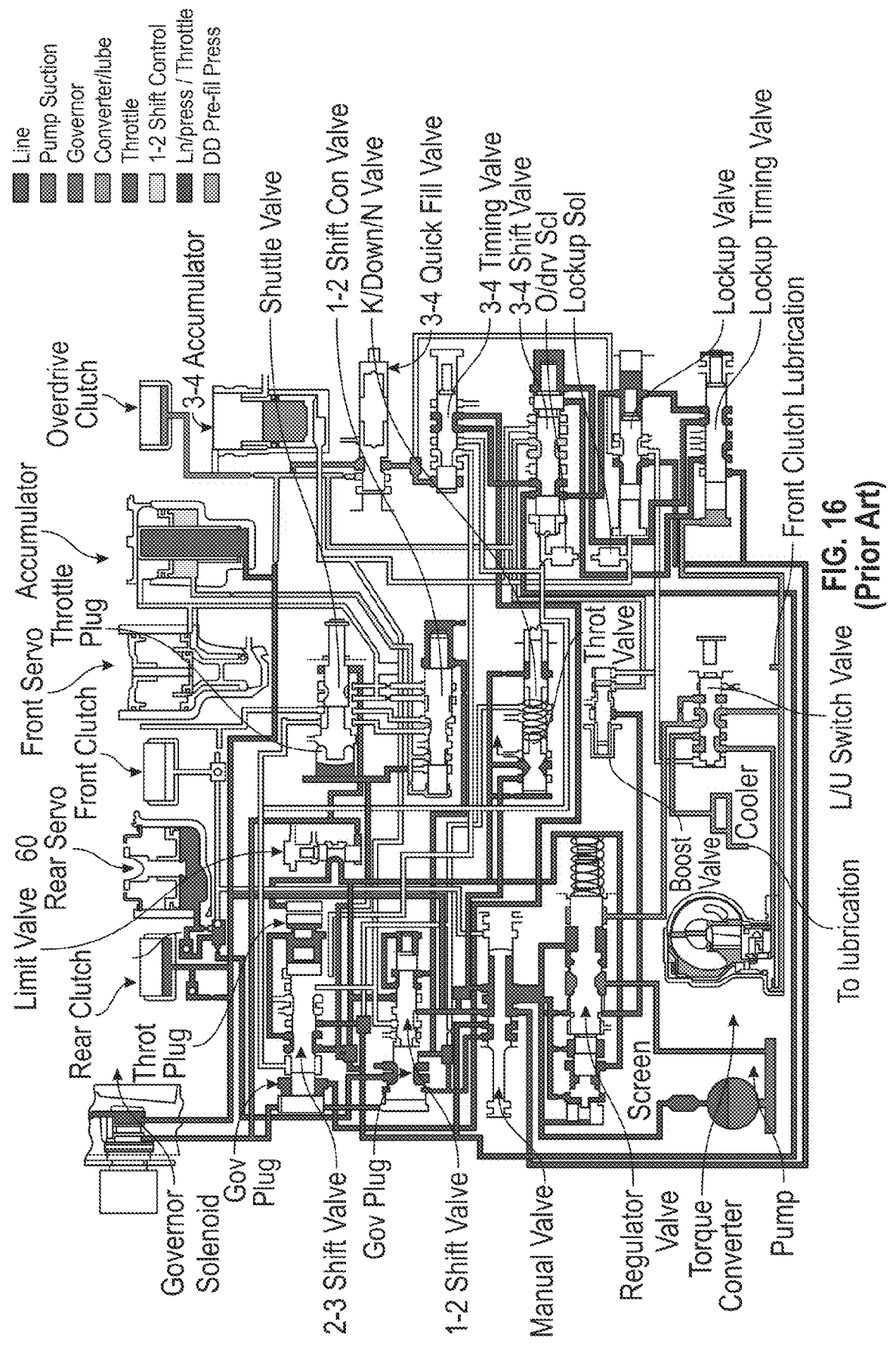
FIG. 16 is a hydraulic circuitry schematic of the prior art transmission in manual first gear (M1).
Figure 17:
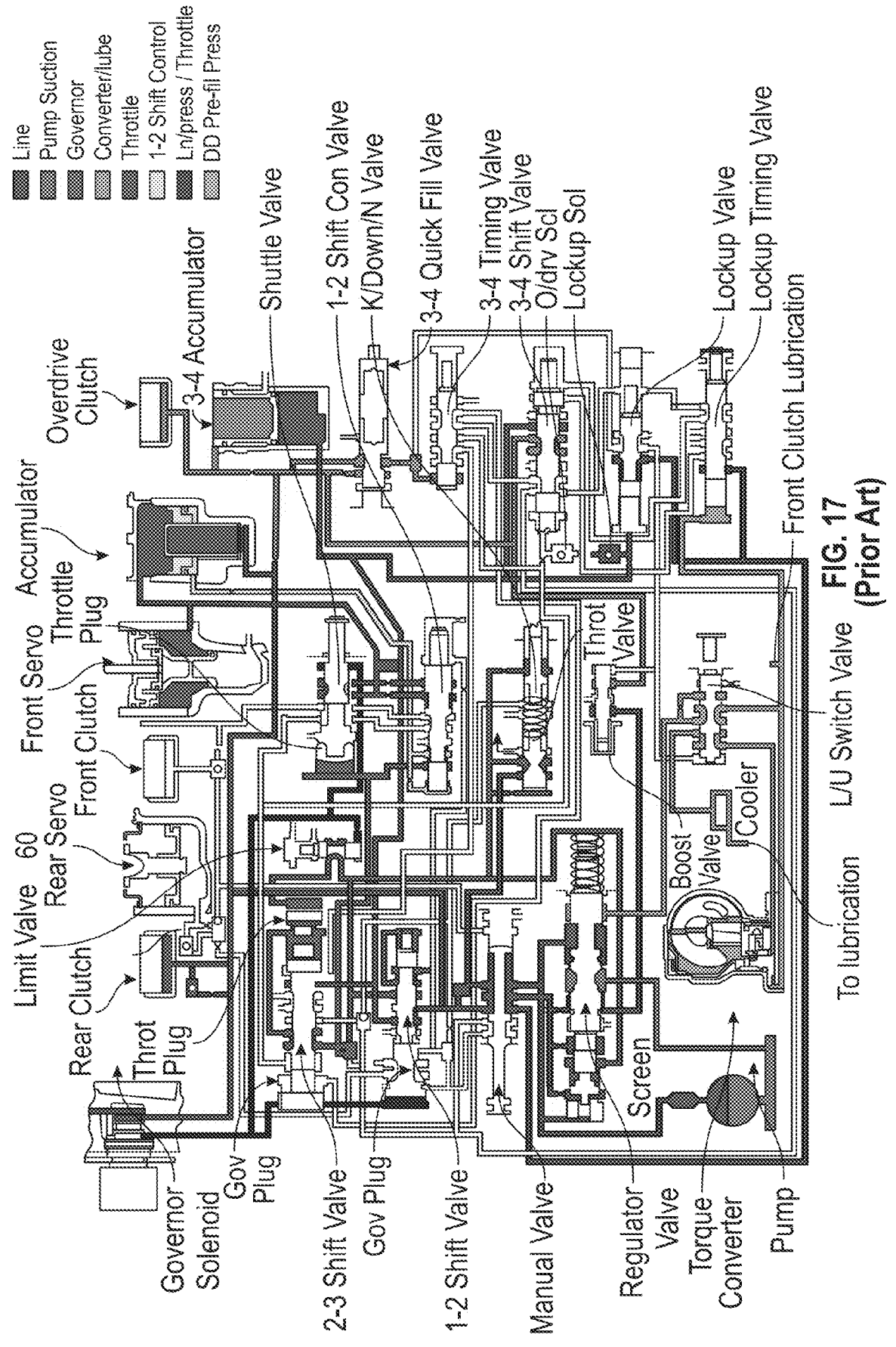
FIG. 17 is a hydraulic circuitry schematic of the prior art transmission in drive range second gear (D2).
Figure 18:
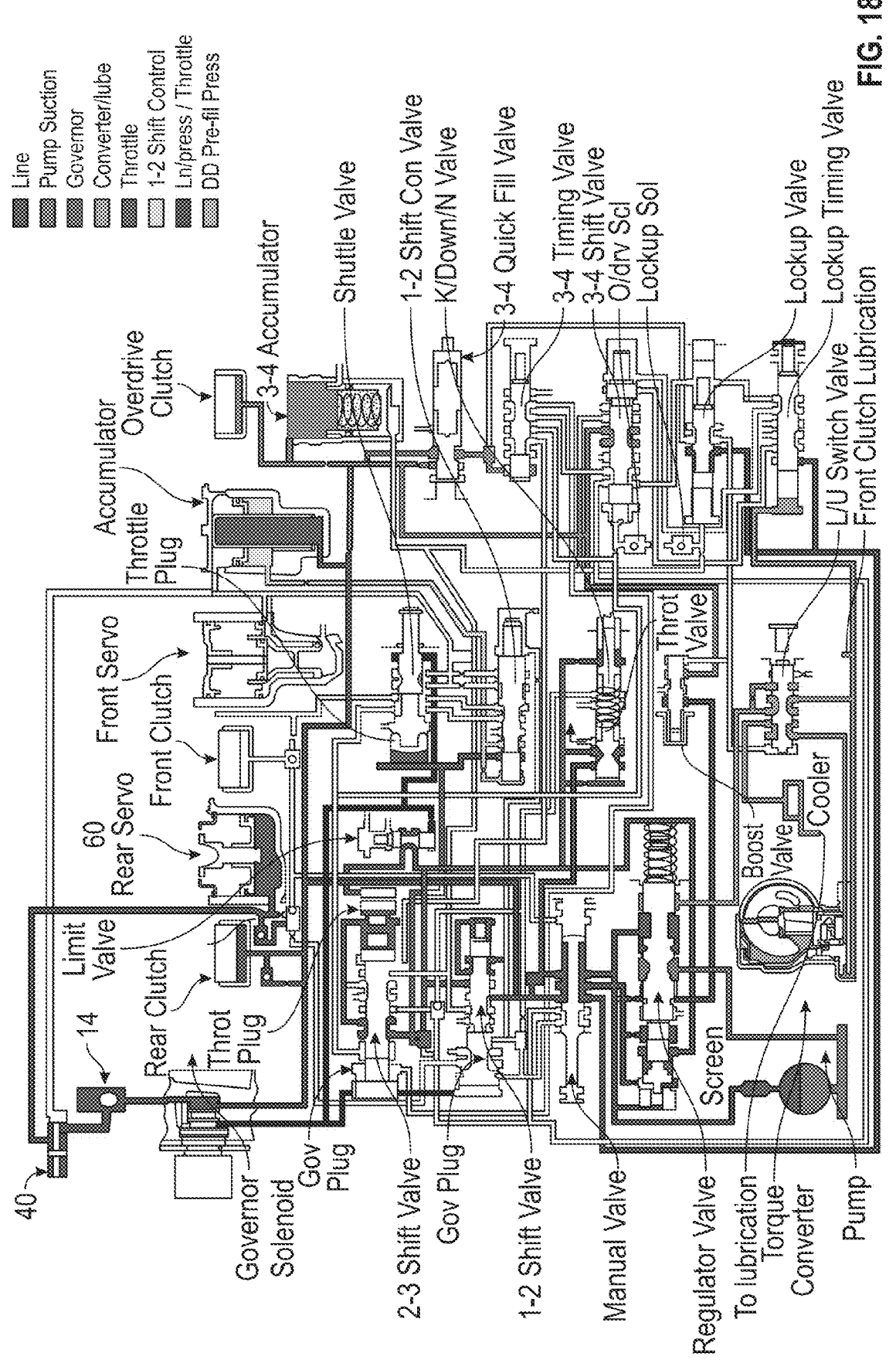
FIG. 18 is a hydraulic circuitry for the automatic transmission of the present invention, in drive range first gear (D1).
Figure 19:
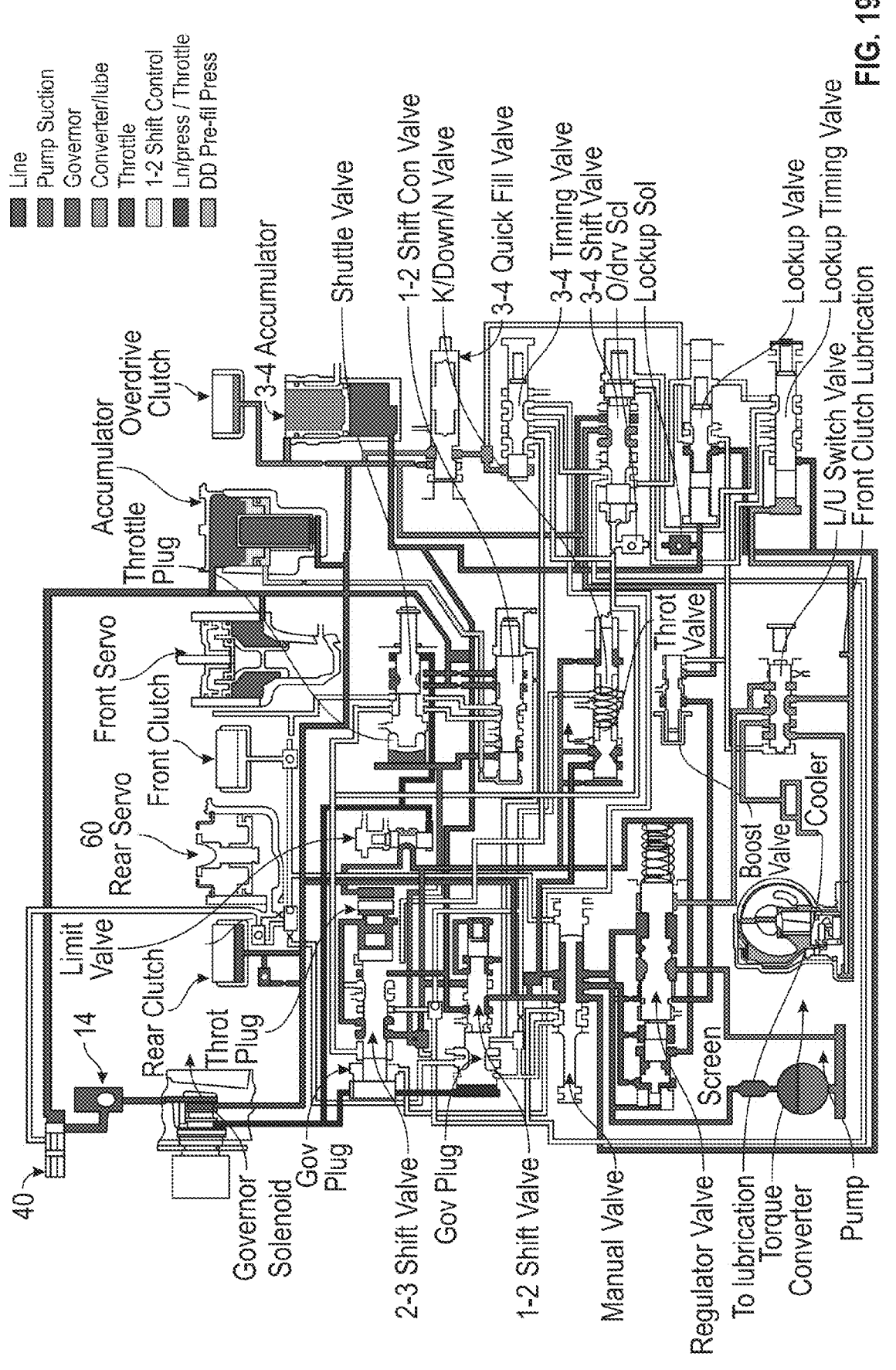
FIG. 19 is a hydraulic circuitry schematic for the automatic transmission of the present invention in drive range second gear (D2).

The line pressure circuit 12A of the governor body 32 supplies oil to the solenoid 28, and the governor pressure circuit 14A supplies oil to the governor sensor 30. The hole 36 in the governor body 32 connects the line pressure circuit 12A to the circuit or oil passage 34. The check ball 46 rests against the hole 36, and allows line pressure from the circuit 12A to flow freely to the passage or circuit 34, while blocking oil from leaking into the circuit 12A when the transmission is in reverse. Similarly, when the valve 40 is at rest, as shown in FIG. 11, the holes 20 are in communication with the circuit 34, thereby allowing forward line pressure to flow to the rear servo or band via the holes ¬¬20, thereby applying the rear band and drive range first gear. When the transmission shifts to second gear, oil flows through the hole 22 to the inboard end of the valve 40, stroking the valve against the bias of the spring 42, and contacting the end plug 44 in the governor body 32. The stroking of the valve 40 blocks the passage or circuit 34 from feeding the holes 20 and opens the holes 20 to the exhaust port 45, thereby releasing the rear band, as shown in FIG. 10.

FIG. 14A is a chart showing component application in the conventional channel casting 10, while FIG. 14B is a chart showing the component application in the channel casting 10A of the present invention. As seen in FIG. 14A, the front or second gear band is only on in second gear, though the hydraulic oil is still present in third and fourth gears. The apply side of the front or second gear servo has a smaller area than the release side of the servo, which is filled by third gear oil, thereby moving the front servo to the released position while in third and fourth gears. This presence of front servo apply oil in second, third, and fourth gears and keeps the valve 40 stroked, thereby maintaining the rear servo in the off position until a time at which the transmission shifts down to first gear again.

In comparison, as shown in FIG. 14B, with the modified channel casting 10A and the new governor body 32, the rear band is on in drive first gear (D1), and does not require the gear selector position to be changed for automatic shifting.

An electronic or mechanical trans-brake can also be utilized with the rear band on in the drive range first gear. The trans-brake applies the same combination of transmission components as forward and reverse gears, thereby locking the gear train of the transmission. The locking action allows the driver to rev the engine to a desired RPM before launching the vehicle, as is common in drag racing. The trans-brake is desirable, since it has more holding power than wheel brakes.

With the prior art channel casting 10 and governor body 24, the rear band of the transmission is only on in M1 position. In comparison, with the channel casting 10A and governor body 32 of the present invention, the band will be on in D, M2, or M1 while the transmission is in first gear. All the forward gear selector positions D, M2, or M1 will start in first gear when the vehicle takes off from a stop position.

With the gear selector in the forward M1 position, the hydraulic circuitry will apply the rear band to an "ON" position, such that the transmission will start in first gear but will not upshift, until the gear selector is moved to another position. This operation is the same for the prior art, as in the present invention.

With the gear selector in the drive M2 position, the rear band will be on, and the transmission will start in first gear and upshift to second gear automatically when the road speed and throttle position parameters are met, according to the vehicle's computer programming. The rear band will be released to an "OFF" position when the shift to second gear is made. While the gear selector is in the M2 position, the transmission will not upshift to a higher gear but if the vehicle speed decreases sufficiently to meet the parameters for first gear, the transmission will downshift first gear. In other words, in the present invention, with the gear selector in the M2 position, the transmission will only shift between first and second gears. While maintaining the rear band in the "ON" position while in first gear.

When the gear selector is in the D position, the transmission will start in first gear, and upshift and downshift to all the other gears as the shift parameters are met, though the rear band is "on" only while the transmission is in first gear.

The scope of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. An automatic transmission having a series of clutches and front and rear servos engageable in various combinations to provide different multiple forward gears and a reverse gear, comprising:
    a valve body with a central casting;
    a governor body operatively connected to the central casting and to the bands; and
    hydraulic circuitry in the central casting providing fluid communications with the governor body to apply the rear servo in drive range first gear; and
    the hydraulic circuitry including a rear servo circuit with holes to allow fluid flow to the governor body.

2. The automatic transmission of claim 1, wherein the central casting has a smooth surface to seal with the governor body.

3. The automatic transmission of claim 1, the governor body includes fluid circuitry and a valve moveable between open and closed positions, wherein fluid flows from the governor body to holes in the central casting to the rear servo circuit when the valve is in the open position and thereby apply the rear servo, and wherein such fluid flow is precluded when the valve is in the closed position.

4. The automatic transmission of claim 1, wherein the hydraulic circuit includes first and second gear circuits, and a hole in the second gear circuit to create a fluid passage to the governor body.

5. The automatic transmission of claim 1, wherein the governor body includes a solenoid and a pressure sensor.

6. The automatic transmission of claim 5, wherein the governor body includes a line pressure circuit to supply hydraulic fluid to the solenoid and a governor circuit to supply hydraulic fluid to the sensor.

7. The automatic transmission of claim 6, wherein the governor body includes a hole to connect the line pressure circuit to a fluid passage.

8. The automatic transmission of claim 7, further comprising a check ball in the hole and a spring to allow movement of the check ball between open and closed positions, whereby fluid flows through the hole to the fluid passage when the check ball is in the open position and fluid flow through the hole to the fluid passage is precluded when the check ball is in the closed position.

9. A method of braking an automatic transmission having forward gears, a rearward gear, and clutches with front and rear bands, the method comprising:
    providing a central casting having hydraulic circuitry coupled to a governor body and to the front and rear bands such that the rear band is applied in drive range 1st gear; and
    applying and releasing the rear band via a valve in the governor body.

10. The method of claim 9, further comprising moving the valve between open and closed positions to apply and release the rear band, respectively.

11. The method of claim 10, further comprising exhausting hydraulic fluid when the valve is closed.

12. The method of claim 9, wherein the rear band releases when the automatic transmission shifts out of drive range 1st gear.

13. An automatic transmission having a series of clutches and front and rear servos engageable in various combinations to provide different multiple forward gears and a reverse gear, comprising:
    a valve body with a central casting;
    a governor body operatively connected to the central casting and to the bands; and
    hydraulic circuitry in the central casting providing fluid communications with the governor body to apply the rear servo in drive range first gear; and
    the governor body including a valve to apply and release the rear servo.

14. An automatic transmission having a series of clutches and front and rear servos engageable in various combinations to provide different multiple forward gears and a reverse gear, comprising:

a valve body with a central casting;

a governor body operatively connected to the central casting and to the bands; and hydraulic circuitry in the central casting providing fluid communications with the governor body to apply the rear servo in drive range first gear; and the governor body including fluid circuitry and a valve moveable between open and closed positions, wherein fluid flows from the governor body to holes in the central casting to the rear servo circuit when the valve is in the open position and thereby apply the rear servo, and wherein such fluid flow is precluded when the valve is in the closed position.

15. The automatic transmission of claim 14, wherein the governor body includes an exhaust port for the fluid circuitry, the exhaust port being closed when the valve is open and being open when the valve is closed.

16. An automatic transmission having a series of clutches and front and rear servos engageable in various combinations to provide different multiple forward gears and a reverse gear, comprising:

a valve body with a central casting;

a governor body operatively connected to the central casting and to the bands; and hydraulic circuitry in the central casting providing fluid communications with the governor body to apply the rear servo in drive range first gear; and the hydraulic circuit including first and second gear circuits, and a hole in the second gear circuit to create a fluid passage to the governor body.

17. An automatic transmission having a series of clutches and front and rear servos engageable in various combinations to provide different multiple forward gears and a reverse gear, comprising:

a valve body with a central casting;

a governor body operatively connected to the central casting and to the bands; and hydraulic circuitry in the central casting providing fluid communications with the governor body to apply the rear servo in drive range first gear;

the governor body including a solenoid and a pressure sensor;

the governor body including a line pressure circuit to supply hydraulic fluid to the solenoid and a governor circuit to supply hydraulic fluid to the sensor; and the governor body including a hole to connect the line pressure circuit to a fluid passage.

* * * * *